United States Patent [19]

Giacone

[11] 4,324,499

[45] Apr. 13, 1982

[54] CONTROL UNIT FOR A SERIAL PRINTER

[76] Inventor: Felice Giacone, Via Rosario di Santa Fe, 14, 10100 Torino, Italy

[21] Appl. No.: 124,952

[22] Filed: Feb. 26, 1980

[30] Foreign Application Priority Data

Feb. 26, 1979 [IT] Italy ............................. 67417 A/79

[51] Int. Cl.$^3$ ........................... B41J 1/26; B41J 19/30
[52] U.S. Cl. ................................ 400/144.2; 400/322;
101/93.19; 318/341; 318/603
[58] Field of Search ..................... 400/144.2, 144.3, 61,
400/62, 70, 320, 322; 318/341, 603, 571;
101/93.19

[56] References Cited

U.S. PATENT DOCUMENTS

| | | | |
|---|---|---|---|
| 4,030,591 | 6/1977 | Martin et al. | 400/144.2 X |
| 4,103,766 | 8/1978 | Ruble et al. | 400/144.2 X |
| 4,226,546 | 10/1980 | Hoffman | 400/144.2 |
| 4,232,975 | 11/1980 | Kane | 400/144.2 |

Primary Examiner—Paul T. Sewell
Attorney, Agent, or Firm—Schuyler, Banner, Birch, McKie & Beckett

[57] ABSTRACT

In a serial printer of the type having a carriage continuously moved along a printing line and supporting a type-member intermittently rotated for selecting the next character being printed, a control unit is provided which performs an algorithm for executing a forecast calculation of the residual time missing in every moment to the type-member for positioning the character being printed. The same control unit calculates a correspondent speed of the carriage depending on that residual time and on the position reached by the carriage on the printing line. The speed of the carriage is thereby continuously controlled from the preceding to the new printing position for causing the printing of the selected character exactly on the printing position at the maximum speed of the carriage consistent with a good print operation.

15 Claims, 11 Drawing Figures

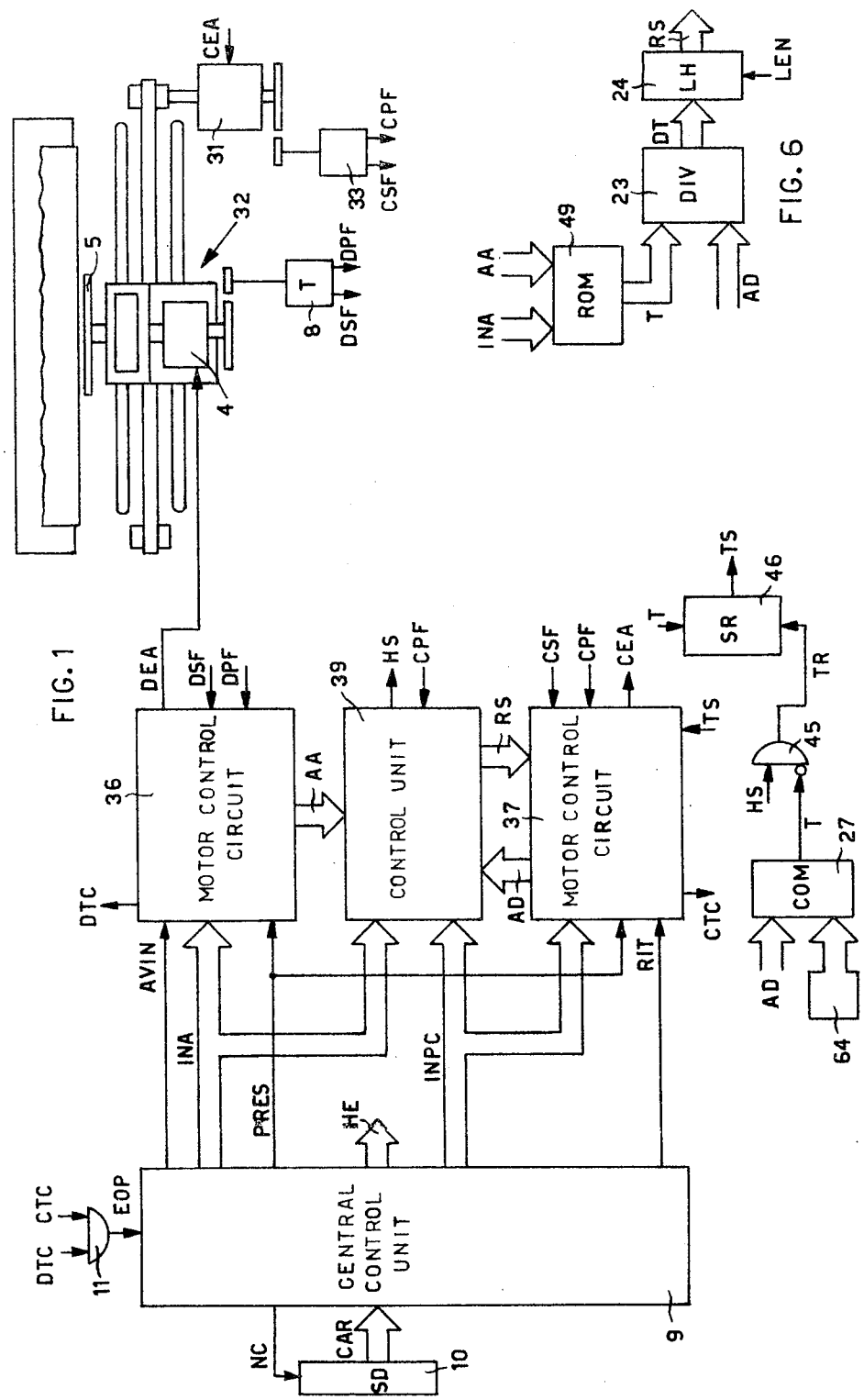

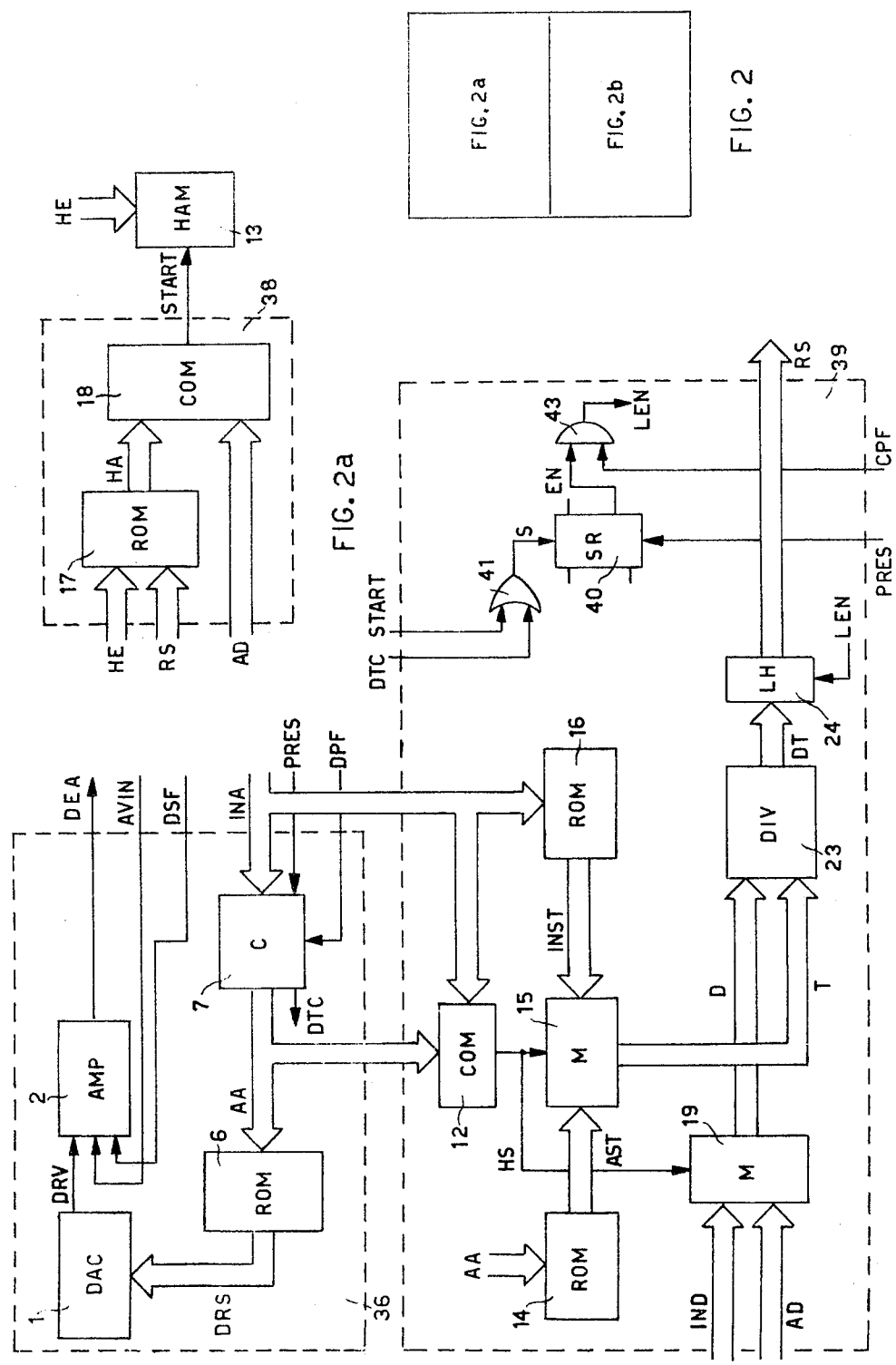

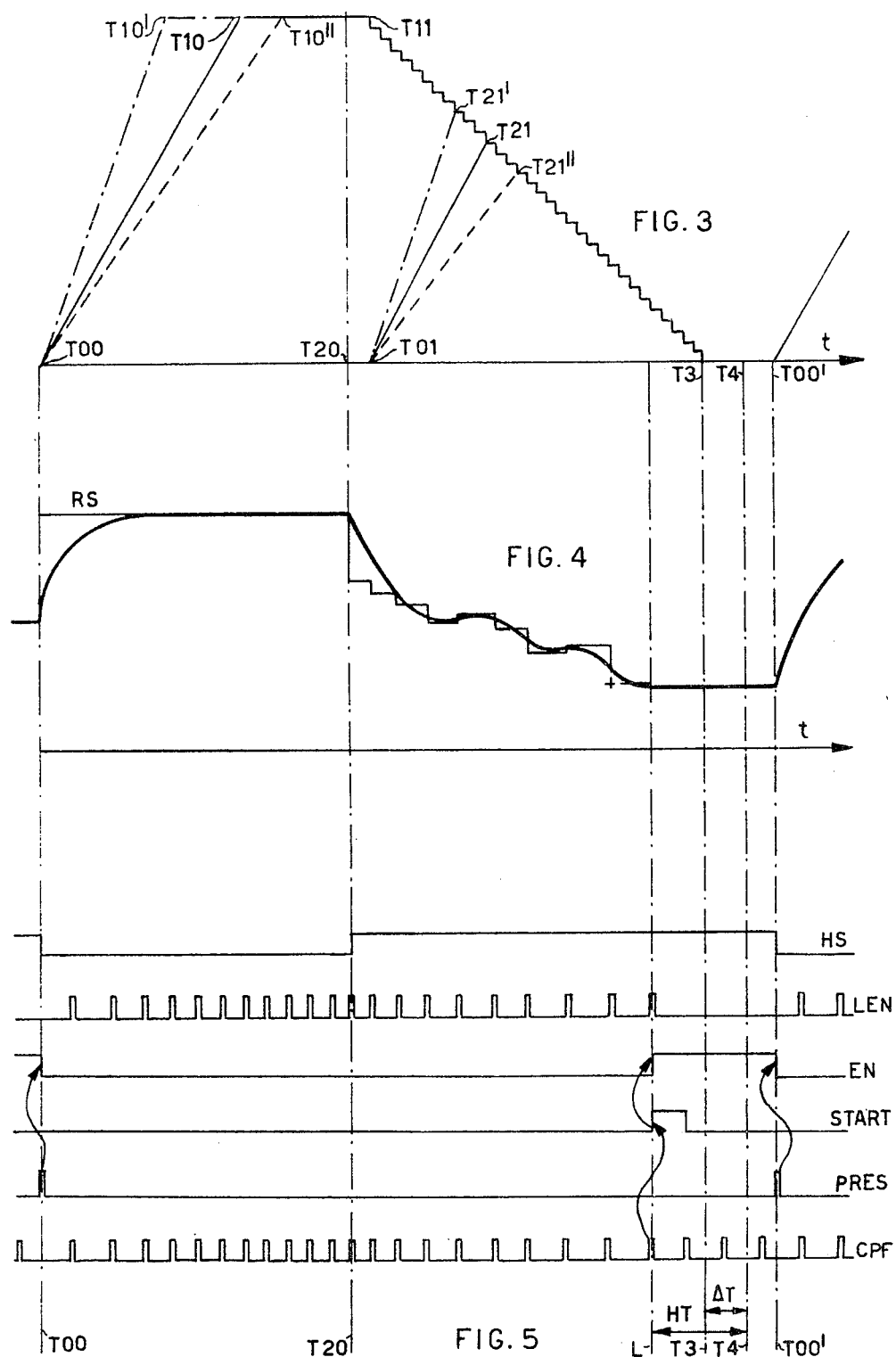

CONTROL UNIT FOR A SERIAL PRINTER

BACKGROUND OF THE INVENTION

The present invention relates to a serial printer of the type with a carriage which can move along a print line and with a character carrying element which can rotate on the carriage and remain stationary during printing.

Serial printers of this type are known wherein, in order to raise the printing speed the carriage is not braked when it comes level with the printing position: what is known as "on-the-fly printing" is performed. So that the selected character can be printed exactly on the predetermined printing point, the carriage is moved at a speed such that the selection can be completed. Selection times being equal the maximum printing speed will therefore be reached if the time taken by the character carrying element to select the character to be typed is equal to the time taken by the carriage to arrive at the intended printing position. This is achieved by various ways of timing the movement of the carriage and that of the character carrying element. In particular the carriage can move, between one printing position and the next, according to speed profiles which are predetermined and chosen as a function of the angle of rotation of the character carrying element.

This solution comprises a very complex unit for the control of the movements of the carriage or of the character carrying element. Moreover, since the real behaviour, electrical or physical, of the devices which make up the printer differs from that which could be provided theoretically, the speed of the carriage has to be controlled with a certain safety margin. This margin becomes manifested in a reduction in printing speed; this is because the carriage must not overrun the printing point before completion of the selection of the character which is to be printed. This is of particular importance when long shifts are involved (also fast shifts) for the carriage, as for example during tabulating or carriage return.

The technical problem of the present invention is to provide a control unit to synchronize the movements of the carriage and of the character carrying element in cases of normal writing and/or in cases of tabulating or carriage return. Said control unit is simple, cheap, and capable of controlling continuously, precisely and optimally the speed of the carriage as a function of the real kinetic behavior of the character carrying element with the object of obtaining optimal printing speed.

SUMMARY OF THE INVENTION

According to the invention, means are provided for determining the time remaining for selection of the character to be printed and a driving device for shifting the carriage at speeds chosen as a function of the instantaneous positions of the carrage and of the residual selection time so as to determine the passage of the carriage across the printing point at the moment when selection of the character to be printed is completed.

According to another feature a checking device replaces the unit which governs the high-speed movements of the carriage and imposes travel speeds such as to permit completion of selection of the character to be printed and passage past the writing point at the maximum carriage travelling speed compatible with the printing.

This and other features will become apparent from the present description of a preferred form of construction, given by way of example but not being limitative, with the aid of the following drawings in which:

FIG. 1 is a diagram in logical blocks of the printer according to the invention;

FIG. 2A shows part of the electrical diagram of the printer according to the invention;

FIG. 3 shows the course, in relation to time, of the rotational speed of the character carrying element;

FIG. 4 shows, in relation to time, the course of the reference speed and the effective speed of the carriage between two printing points;

FIG. 5 shows the timing diagrams relative to the functioning of the control unit;

FIG. 6 shows a variant of the electric diagram of FIG. 2A;

DESCRIPTION OF THE PREFERRED EMBODIMENT

Figure 7:
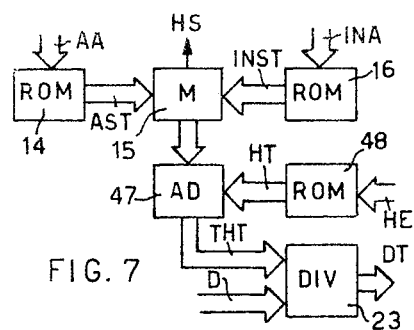
FIG. 7 shows a variant of the electrical diagram of FIG. 2A.

The printer in FIG. 1 comprises a carriage 32, a character carrying member 5 of the "daisy wheel" type mounted for rotation on the carriage, a direct current motor 4 to produce the movement of the character carrying element, a transducer 8 connected to the motor 4. The transducer 8 sends out signals indicating the speed and the position of the character carrying element to the input of the block 36 which represents the control circuit for the motor 4.

In a totally similar manner the carriage 32 is moved by the motor 31 and the transducer 33 sends feedback signals to the circuit 37 which represents control of the motor 31.

A data source 10 sends the characters to be printed to the central control unit 9. The central control unit 9 converts the information coming from the source 10 into data concerning the movements of the various mechanical components which form the printer and sends said data to the inputs of control circuits 36 and 37 and to the control unit 39 connected to circuits 36,37.

The data source 10 may be a processor, an information transmission line, the buffer of a keyboard or other similar data sources.

The daisy-wheel character carrier 5 consists of a hundred petals, each carrying a character.

The transducer 8 comprises an optoelectronic wheel with two rows of windows corresponding to the petals of the character carrying element 5 and capable of generating four position signals DPF to each petal which is selected; the transducer 8 also generates an analogous signal DSF proportional to the speed of rotation of the element 5.

The transducer 33 is of the same type and is connected in such a way as to generate twenty-four position signals CPF for a movement of 0.10" of the carriage 32 (nominal distance between two printing points); the transducer 33 also generates an analogous speed signal CSF. Where there is proportional spacing the distance between one printing point and the next may vary from a minimum of 0.66" to a maximum of 1.17": these spacings are corresponded to respectively by 16 and 28 CPF signals.

It must be mentioned at this point that for purposes of simplicity in the following description the various signals and the channels carrying them are identified by the same name: for example reference will be made to channel AA at the output of circuit 36 and to signals AA representing a certain angle.

The control circuit 36 receives, from the central control unit 9 through the channel INA and at the time indicated by the signal PRES, the data relating to selection of the next character to be printed. The circuit 36 regulates the speed of the motor 4 through the signal DEA and on channel AA it generates signals which represent the rotational angle still needed to complete the selection.

At the same time the control circuit 37 receives, on channel INPC, the data relating to the carriage shift required to reach the next printing point, controls the speed of the motor 31 by means of the signal CEA and on channel AD it generates signals which represent the space still needed to reach the preselected printing point.

The essential function of the control unit 39 is to generate reference signals RS for the carriage speed at the input of the circuit 37 which controls said speed. The signals RS are processed both as a function of the positions gradually reached by the carriage and by the character carrying element indicated by the signals AD and AA and also as a function of the initial shift signals INA and INPC. The signal HS generated by the circuit 39 has the function of indicating whether or not the character carrying element 5 has completed half the rotation needed to reach the character preselected for printing.

The control circuits 36 and 37 signal completion of the movements commanded to the character carrying element 5 and to the carriage 32, activating respectively the signal DTC and the signal CTC at the input to the AND gate 11. The signal EOP at the output of the AND gate 11 informs the central control unit 9 of the end of printing of the preselected character. When the distance of the carriage from the printing point is greater than 0.27", that is to say the signal AD as will be described subsequently is represented by a number greater than 64, the comparator 27 activates the signal T which, in turn through the set-reset type flip-flop 46, activates the signal TS at the input of the circuit 37. The high logic level signal TS indicates that the carriage 32 must proceed at a special speed (for example in the case of tabulating or carriage return); in these cases the circuit 37 controls the motor 31 in a manner independent of the reference signals RS. When the signal T returns to the low logic level and if the character carrying element has covered at least half of the selection angle (HS has a high logic level), the AND gate 45 generates the signal TR which resets the flip-flop 46: the signal TS returns to low logic level and the control of the motor 31 is carried out with reference to the RS signals, that is to say once again as a function of the instantaneous positions of the character carrying element 5 and the carriage 32. This makes it possible to impose automatically rapid movements to the carriage 32 when the next printing point is located at a certain distance on the printing line but to exercise a precise control of the carriage movement (in conformity with speeds adapted to on-the-fly printing) when it has come into the vicinity of the respective printing point.

This basic concept will be illustrated in detail with reference to FIGS. 2B and 9.

The signals AVIN, RIT and NC at the output of the central control unit 9 and not mentioned so far operate respectively the direction of rotation of the character carrying element 5, the return of the carriage 32 and the request for a new character for printing from the data source 10.

The signals HE select the striking force of the hammer and their application will be explained below.

Figure 2B:
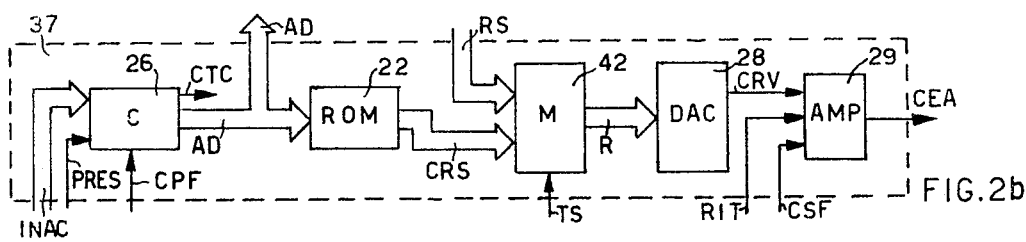
FIG. 2B shows the electrical diagram of the carriage speed controller.

The electric diagram of the logic blocks 36, 37 and 39 is shown in detail in FIGS. 2A and 2B.

The control circuit 36 is made up of a counter 7, a read-only memory 6, a digital/analog converter 1, an operational amplifier 2.

When the character carrying element has to select a new character the central control unit (shown in FIG. 1) 9 pre-loads the counter 7, through the channel INA and at the moment indicated by the signal PRES, with a number which indicates the rotation to be performed.

The feedback signal DPF counts off the counter 7 with the result that the signals AA at its output show the rotational angle still needed to complete selection.

In the present embodiment the signal DPF generates four count-off fronts to each petal selected; the counter 7 must be capable of being pre-loaded up to 200 (turning of half a rotation of the character carrying element 5) and the signals AA consist of 8 bits. The signal DTC is the signal for the end of counting by the counter 7: it also signals the end of selection of the character to be printed. The channel AA addresses the memory 6 which can generate correspondingly thirty-two different speed indications on the 5 bit channel DRS. In the present embodiment these speeds are comprised between 0 and 1500 rev/min.

As long as the signals AA which address the memory 6 indicate a residual selection angle, which shall be called $\theta$, above a certain predetermined value, the words DRS which are generated correspondingly indicate, as reference for the character carrying element 5, the maximum speed. When the signals AA indicate an angle below the aforesaid value the character carrying element 5 has to start the braking phase and the words of memory 6 which are addressed indicate successively lower speeds until rotation is stopped when $V=0$, that is to say selection is completed. The deceleration which is obtained is schematically that indicated by the stepped course in FIG. 3.

The frequency with which the signals AA vary and hence the words addressed in the memory 6 differs in conformity with the speed of the character carrying element 5: to decrease the reference speed at regular instants it is sufficient to program the memory 6 in such a way that the signals AA address successions, at first longer and then shorter, of words indicating the same speed.

The link between the speed levels imposed on the character carrying element 5 in the deceleration phase and the residual selection angle $\theta$ is given by the formula $DRS = \sqrt{2\epsilon\theta}$, where $\epsilon$ is the mean deceleration imposed on the character carrying element 5. This makes it possible to brake the character carrying element on a curve of constant means deceleration with consequent advantages (specified below) as regards the provision of residual selection times.

The converter 1 converts the DRS signals into thirty-two different analog levels DRV while the operational amplifier 2 compares said levels with the DSF level indicating the actual rotational speed of the character carrying element 5 and generates the command signal DEA. It is the actual central control unit which establishes the direction of rotation by means of the signal AVIN. The remainder of the blocks in FIGS. 2A and B will be described subsequently. The functioning of the circuit 36 will now be dealt with more fully with reference to FIG. 3. The graph in FIG. 3 shows the course of the selection speed plotted against time in a few different cases.

The course T00, T10, T11, T3 indicates a typical course for the rotational speed of the character carrying element during a selection process. The initial speed is zero (the instant T00), while the signal DRV indicates a maximum reference speed. Thus, between the instants T00 and T10 the character carrying element 5 undergoes a free acceleration dependent upon the mechanical properties of the components. In this way it is possible to reach the maximum speed (imposed by the DRS signals) as rapidly as possible; this speed can be reached before (instant T10') or after (instant T10") depending on the real behaviour of the components, which always deviates from the nominal behaviour owing to tolerances in manufacture and variations in working conditions (wear, temperature, etc.).

Starting from instant T10 (or T10' or T10") the rotational speed of the character carrying element 5 is controlled by the memory 6 on the basis of the angle of rotation still needed θ (indicated by the signals AA) and the preselected mean deceleration ε. Thus the speed profile T10, T11, T3 is determined unequivocally and independently of the behavioural tolerances of the components and has a course formed by thirty-two progressively lower speed levels, selected as a function of the closeness of the preselected character. The distance T01, T21, T3 indicates a shorter selection: the character carrying element 5 still undergoes a free acceleration from the instant T01 but its speed equals the reference speed selected by the memory 6 before the maximum speed was reached.

Depending on the type of free acceleration followed, the speed of the character carrying element 5 comes under the control of the memory 6 from the instants T21 (nominal course) or T21' or T21".

The remainder of the circuits in FIGS. 2A and B will now be described. When the signal TS at the input of the circuit 37 in FIG. 2B is at a high logic level (next printing point more than 0.27" away, corresponding to 64 CPF impulses), the multiplexer 42 connects the CRS channel at the output of the memory 22 to the R channel at the input of the digital/analog converter 28. Under these conditions the functioning of the circuit 37 for control of the speed of the carriage 32 becomes qualitatively identical with that of the above-described circuit 36. It will be specified simply that in the present embodiment the counting-off fronts of the feedback signal CPF at the input of the counter 26 are 24 for every 0.1" shift of the carriage 32; the counter 26 may be pre-loaded with a binary member of 2280 to store the indication of a shift over the entire length of the printing line; the memory ROM 22 selects 64 different speed levels from 0 to 130 cm/sec. Under these conditions the carriage 32 performs its movements at the maximum speed compatible with the acceleration and deceleration times. On the other hand when the signal TS is is at a low logic level the reference speeds selected by way of the multiplexer 42 are those represented by the signals RS which are adapted to on-the-fly printing.

The various courses for the speed of the carriage 32 following therefrom will be explained better below with reference to FIGS. 4 and 9.

The control unit 39 shown in FIG. 2A comprises a memory of the read-only type 14, two multiplexors 15 and 19, a comparator 12, a divider circuit 23 and a storage circuit 24, referred to briefly hereinafter as 'latch'.

The signal HS at the output of the comparator 12 is at high logic level when the signal AA represents a number less than half the number represented by the signals INA and is at low logic level in the opposite case. This is obtained simply by connecting the wires of the INA channel in a manner offset by one position with the inputs of the comparator 12 so that to each wire of the INA channel there corresponds the input which is of less immediate significance: in this way the number present at the input of the comparator 12 is half the number represented on the INA channel. The INA signals indicate the total angle of rotation of the character carrying element 5 whereas the AA signals indicate the remaining rotational angle: from this it follows that physically the signal HS indicates whether or not the character carrying element 5 has rotated through half the angle needed to reach the next character to be printed.

During the first half of the selection operation the multiplexors 15 and 19, commanded by the signal HS, connect respectively the channel AST with the channel T and the channel IND with the channel D. The INST signals are generated by the memory 16. The memory 16 is addressed by the INA signals which indicate the angle through which the character carrying element 5 has to rotate to select the character for printing starting from the position of the last character printed. In the present invention the rotations of the character carrying element 5 go from a minimum of zero to a maximum of fifty petals (in the clockwise and in the anti-clockwise direction); thus, from the point of view of the number of petals to select, there are fifty types of different selection.

Correspondingly, the memory 16 contains fifty words each addressed by a selection type. The word which is generated, at each character to be printed, on the INST channel indicates the duration provided for the type of selection then in progress. It is obvious that this provision cannot be precise because the initial acceleration of the character carrying element (which for reasons of rapidity is not controlled) has a variable course (FIG. 3).

So long as the character carrying element 5 has not completed half the rotation in course, the INST signals are located, through the multiplexor 15 and the channel T, at the input of the dividing circuit 23. For the same period of time the IND signals also, by way of the multiplexor 19 and the channel D, are located at the input of the divider 23. The IND signals indicate the shift which must be made by the carriage 32 from the position of the last character printed. The divider 23 correspondingly generates the signals DT at the output. The magnitude represented by the signals DT is the quotient D/T, that is to say, physically, the ratio between the distance which the carriage has to cover to reach the next printing point and the time provided for selection of the next character; therefore the DT signals indicate the mean speed at which the carriage must move to reach the next printing point at the same moment in which selection is completed.

In the present embodiment the divider 23 is made up by means of a simple read-only memory in which the various words addressed conjointly by the signals D and T represent their quotient; ten different speed references are generated on the channel DT, from a minimum of 0 to a maximum of 20.3 cm/sec. This make-up is by way of example, however: if it is desired to produce a more varied scale of references in order to obtain finer regulations it is possible, as an alternative, to use digital dividers or other more sophisticated devices.

When the character carrying element 5 is half way through the selection the comparator 12 activates the signal HS which switches the two multiplexors 15 and 19. The signals T at the input of the divider 23 now copy the signals AST which come from the read-only memory 14, while the signals D copy the signals AD. The signals AST indicate the time needed to complete the selection and are derived as a function of the signals AA (residual selection angle). Half way through the selection the speed of the character carrying element 5 is already under the control of the memory program 6 (see also FIG. 3, time T 20). Depending on the speeds and typical characteristics of the components the comparison circuit 12 can be so constructed as to affect switching in respect of other points of the selection. The condition has to be observed according to which the memory 14 and the signals AD must not be involved except when the speed of the character carrying element follows the profile predetermined by the memory 6.

For most of the time, during this second phase, the character carrying element 5 follows the deceleration profile shown in the form of steps (see FIG. 3). The time needed to complete the selection of the character is now calculated exactly on the basis of the formula $t = \sqrt{2\theta\epsilon} + \Delta T$ with which the memory 14 is programmed, where $\theta$ is the angle of rotation still to be covered, indicated by the signals AA, $\epsilon$ is the mean deceleration imposed on the character carrying element when when it follows the speed profile shown by steps (T11–T3 in FIG. 3): it should be noted particularly how regulation of the speed of the character carrying element 5 in accordance with a constant mean deceleration $\epsilon$ (imposed by the memory program 6) makes it possible to provide precisely for the residual time for selection. $\Delta T$ is the time needed for performing the final oscillations in the stopping of the character carrying element 5; the time $\Delta T$ is also demonstrated in the graphs of FIG. 3 ($\Delta T = T4 - T3$) and will be explained specifically again in the course of the description. In this second part of the selection time also the divider 23 generates at the output signals DT indicating the mean speed which the carriage 32 must keep to in order to reach the printing point simultaneously with the completion of the selection: now, however, the signals DT are updated continuously as a function of a forecast of the residual selection time for the character carrying element 5 (based on the real instantaneous position) and on the instantaneous position of the carriage 32. The reference signals DT are then staticized by the latch 24 on the channel RS.

The basic consideration on which construction of the circuit 39 is based is that, from a certain moment onwards, the speed of the character carrying element is controlled in conformity with a single course for all types of selection, with the result that it is possible foresee exactly and by means of a limited capacity memory (memory 14) the residual selection times. However, at the start of selection an approximate forecast is made by means of the fifty-word memory 16 (by way of the free motion) of the overall selection time. The RS signals, correspondingly processed and selected as speed references for the carriage 32 (during normal writing) are at first approximated and then made precise because they are based on the effective positions reached. Thus an exact concurrence is produced between the completion of selection and the passage of the carriage 32 past the printing point at a speed adapted to the printing.

Alternatively (see FIG. 6), to obviate the logic of switching and the presence of two memories, it is possible to use a single memory 49 addressed by the channels INA and AA. Depending on the selection type (from 1 to 50 characters) the channel INA selects 50 different memory areas. Each area is then addressed progressively by the signals AA and words are generated on the channel T indicating gradually the residual times for selection. The times are forecast approximately during the free motion of the character carrying element 32 and precisely during programmed motion.

The channel AD indicates the distance of the carriage 32 from the printing point with the result that the signals DT indicate the mean speed to which the carriage must keep in order to effect the meeting with the character carrying element 5.

Such an arrangement, however, entails the use of a very large memory area (approximately ten times that of the memories 14 and 16) because for each type of selection the whole programming is repeated which is necessary for forecasting all the residual selection times.

Now, with reference to FIGS. 2A, 3, 4 and 5, it will be explained the effect which the signals DT have on the course of the speed of the carriage 32. The graph in FIG. 4 shows the course of the reference speeds (RS) and the effective speed (marked section) of the carriage corresponding to the selection T00, T10, T11 and T3, represented on FIG. 3. It is apparent that in the case of the printing of a character shown in FIGS. 3, 4 and 5, the distance between the two printing points under consideration corresponds to 24 position signals CPF (mean distance between two consecutive letters), so that the control circuit 39 effectively follows the references RS.

The position signals CPF (coming from the transducer 33 in FIG. 1) are shown in FIG. 5: the interval between two consecutive impulses varies with the speed of the carriage 32. The signal LEN copies, by way of the AND gate 43, the signal CPF and allows the latch 24 to store the signals DT. In the present embodiment the speed references RS at the output of the latch 24 are therefore updated at each impulse of the signal CPF, that is at each 0.042" shift of the carriage 32 along the printing line. This selection is given by way of example but is not limitative: depending on the kinetic behaviour of the mechanical parts concerned and the requirements for precision in control the references RS may be updated more or less frequently: it is sufficient to generate the CPF impulses at a greater or lesser distance or to replace them by a signal of a different frequency.

The START signal, which commands the release of the hammer, or the DTC signal which comes from the counter 7 and indicates completion of the selection, set the "set-reset" type flip-flop 40 through the OR gate 41 and the signal EN, brought to the low logic level, blocks the passage of the CPF signal through the AND gate 43. The channel RS now maintains the last speed reference for the final section of the carriage travel. It can be seen from the timings in FIG. 5 that the signals LEN copy the signals CPF until the START signal is activated, which in turn is responsible for the activation of the signal EN (the instant L). The signal PRES, generated by the central control unit 9 (FIG. 1) determines the preloading of the two counters 7 and 26, by which means it starts off the new selection of the character carrying element 5 (instant T00') and the carriage continues on to the new printing point. The PRES signal also resets the flip-flop 40 (and thus the signal EN) and so the signals CPF are again allowed to command the latch 24 in FIG. 2A.

Corresponding with the first part of the selection (FIGS. 3, 4 and 5) between instants T00 and T20 the signal HS remains at low logic level and the RS signals indicate constant reference speed: the reason is that the inputs of the divider 23 in FIG. 2A are the constant values indicated by the signals INST and IND.

After the instant T20 the signal HS is at high logic level and the reference speed indicated by the signals RS is updated at each LEN impulse in accordance with the positions effectively reached by the carriage 32 itself and by the character carrying element 5. Correspondingly the carriage 32 (heavier line) moves initially to a predetermined speed RS and then varies its own speed until the instant L (release of the hammer), after which the last reference value RS persists. At the instant T00', when a new selection phase begins, a new reference speed RS is generated and the cycle is repeated. The purpose of the circuit 38 (FIG. 2A) is to time the release of the hammer in conformity with the speed of the carriage, level with the printing point, indicated by the signals RS, and the force HE decided by the central control unit 9 (FIG. 1). The read-only memory 17 is addressed by the signals HE and RS and is programmed so as to generate at the output, on the channel HA, an indication of the advance with which the hammer must be released relative to the printing point. The signal HA is compared by the comparator 18 with the position effectively reached by the carriage, indicated by the signal AD. When the carriage is at the appropriate spot the comparator 18 activates the START signal at the input of the actuator 13 which releases the hammer with the desired force (HE).

FIGS. 3, 4 and 5 illustrate the release of the hammer, effected at the instant L with a certain advance over the completion of the selection T3; impact occurs at the instant T4; the flight time is indicated by the symbol HT. The time ΔT intervening between the instant T3 and the instant of impact T4 is, for the printer now under consideration, of the order of 1 ms and it represents the lapse of time necessary for the total damping of the oscillations during stopping of the character carrying element 5.

As from the instant L the signals RS are held constant to provide a better guarantee of the precision of the position of impact on the printing line.

During the time between the instant T4 and the start of the new selection T00' the hammer returns to the initial position.

By means of the present method of synchronising, at the instant T4 when selection is completed, the arrival of the carriage (at a speed suited to printing) and the impact of the hammer, the timing of the printing operations is optimized and the speed is limited solely by the mechanical features of the printer.

There now follows a summary of the method on which the above-described device is based:

a certain optimal course is selected for the speed of rotation of the character carrying element 5 for selecting the next character to be printed.

The speed of the carriage is regulated in conformity with a suitable algorithm which takes into account the number of characters on the character carrying element 5 effectively selected and the space which is effectively covered by the carriage 32; regulation of the speed of the carriage between one printing position and the next is at first approximate and then more precise until the residual selection times can be forecast exactly.

The hammer is released with the carriage in motion and selection to be completed in such a way that the impact occurs to correspond with the preselected printing position without slowing up the other mechanical parts in any way.

In certain cases the selection time may be short, or even nothing at all, with the result that the maximum transport speed of the carriage is not sufficient to lead the carriage to the printing point simultaneously with completion of the selection and it arrives with a certain delay: in these cases, in general, the release of the hammer is not superimposed on the selection time but only on the advance of the carriage.

Alternatively, by a simple modification of the circuit 38 in FIG. 2, represented in FIG. 7, it is possible to actuate the hammer at the precise moment when selection is ended. The formula according to which the memory 14 in FIG. 7 is programmed disregards the damping time ΔT: $t=\sqrt{2\theta/\epsilon}$; therefore the time indicated by the signals AST is that taken to complete the selection of the character to be printed but not the stopping oscillations, as has previously been considered.

Figure 8:
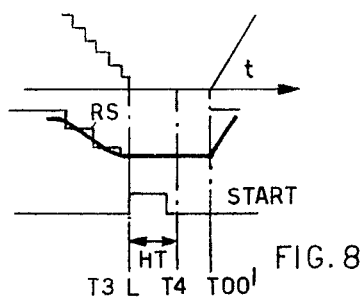
FIG. 8 shows courses of velocity for the carriage and the character carrying element in relation to the variant in FIG. 7.

The read-only memory 48 has at its input the striking force of the hammer HE and at its output the time HT provided for the flight of the hammer; the time HT is totalled by means of the adder 47 on to the time indicated by the signals T. The result can be seen in FIG. 8 which shows the modifications to the courses shown in FIGS. 3, 4 and 5 following the new form of construction: the instant T4 at which the carriage 32 passes the printing point is delayed with respect to the instant T3, no longer by a time lapse ΔT but by a time lapse equivalent to the flight time HT of the hammer. The result is that the instant L at which the hammer is released coincides with the instant at which selection is ended T3 and the hammer release time HT is employed in awaiting extinction of the stopping oscillations of the character carrying element 5.

The disadvantage of this variant is a loss of time in cases where the flight time HT of the hammer exceeds the damping period of the oscillations, while the advantage is the possibility of controlling (as is made clear in FIG. 8) the speed of the carriage 32 up to the end of selection T3.

Figure 9:
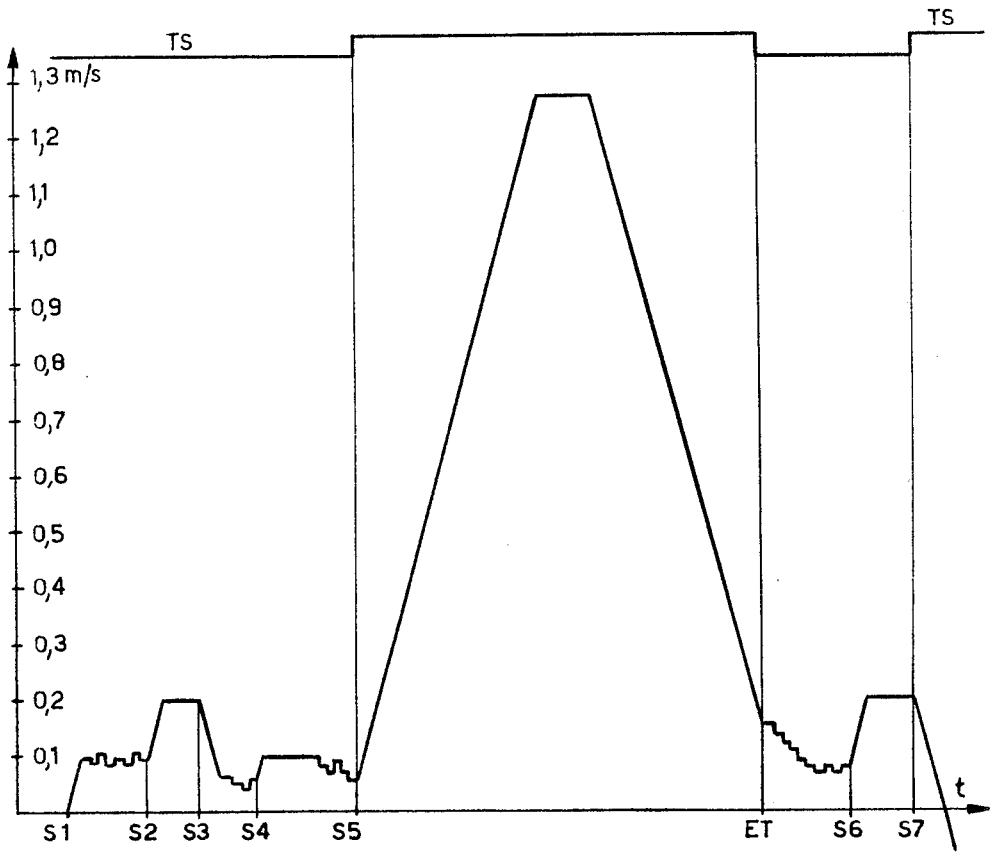
FIG. 9 shows, as a function of time, the course of the carriage speed during the printing of some characters and a tabulating operation.

FIG. 9 summarises the functioning of the printer according to the invention, describing a typical course for the speed of the carriage 32 during the printing of a word of five characters at the instants S1–S5, followed by a shift to tabulating speed for the printing of a further two characters following at the instants S6 and S7, after which there follows the carriage return.

At instant S1 (carriage stationary) the first character is printed; immediately afterwards the selection of the next character begins and the speed references RS impose an acceleration on the carriage 32; during the second part of the selection, regulation takes place at each feedback impulse CPF and speed variations occurs more frequently until the carriage reaches the printing point at the instant S2. The procedure is similar for printing characters at the subsequent instants S3, S4 and S5. Printing at instant S3 takes place at the maximum permitted speed: this is the case where the selection time is fairly short and the ratio D/T indicates the maximum speed.

The times intervening between the instants of printing are different, both because of the varied speed of the carriage and also because of the variability of the distance between the different printing points.

It is important to observe that the speed of the carriage 32 from instant S1 to instant S5 varies continuously to adjust itself to the selection times but in an interval lying between 0 and 20.3 cm/sec which is the maximum speed for maintaining a good printing quality.

At instant S5 the central control unit 9 sends a command for carriage advance greater than 0.27": the signal TS is activated automatically (see also FIG. 1) and the circuit 37 (FIG. 2B) controls the carriage in conformity with the much higher speeds indicated by the memory 22. When the carriage 32 comes to 0.27" from the preselected printing point (instant ET), the signal TS is reset with the result that the circuit 37 again follows the reference speeds RS governed by the movement of the character carrying element 5; printing of the preselected character then takes place at instant S6. After printing of a further character, at instant S7, the carriage return is commanded and so the signal TS becomes active again and the circuit 37 commands the carriage 32 at a high speed and one opposite to the preceding ones.

It is clear from this description that in the printer according to the invention the carriage speeds are are controlled continuously in an optimal manner with respect to the real selection times, both in the case of normal writing and in the case of special shifts such as for tabulating or carriage return, so that the carriage is never arrested, printing is always carried out on-the-fly and thus all the mechanical problems and problems of oscillation inherent in the arrest of the carriage are obviated.

All extensions or modifications which could be made from this present description by those skilled in the art are to be taken as being contained in the spirit of said description.

I claim:

1. A serial printer comprising a carriage movable by a motor along a printing line from a preceding print position to a new print position; a print hammer and a rotatable type member mounted on the carriage; selecting means for intermittently rotating said type member a variable angle from one character position to another character position according to a predetermined law of motion for positioning a selected character in front of the print hammer, in the path of the impact of said selected character; length of selection time forecast means for generating length of selection time data dependent on a forecast length of selection time required by said selecting means for the rotation of the type member through said variable angle; control means comprising a servo control feedable with predetermined speed data dependent on the selection length of selection time data causing said motor to maintain said carriage in movement during the impact of said hammer; and updating means for feeding said servo control with updated speed data dependent on an updated forecast of the length of selection time effected during rotation of said type member through said variable angle.

2. A serial printer comprising a carriage moved by a motor along a printing line from a preceding print position to a new print position; a print hammer and a rotatable type member mounted on the carriage; selecting means for intermittently rotating said type member a variable angle from one character position to another character position for positioning a selected character in front of the print hammer in view of the impact of said selected character; length of selection time forecast means for generating length of selection time data dependent on a forecast length of selection time required by said selecting means for the rotation of the type member through said variable angle; control means comprising a velocity servo control of said motor feedable with predetermined speed data dependent on the selection length of time data for causing said motor to maintain said carriage in movement during the impact of said hammer; and updating means for causing the selected character to be exactly printed on said new print position at the maximum speed of the carriage consistent with a good print operation and minimizing any printing misalignment due to errors between the forecast and true length of selection time and the velocity of the carriage wherein said updating means comprise a carriage position; a transducer for sensing discrete intermediate positions of the carriage included between the preceding and the new print position, residual length of selection time forecast means responsive to each new intermediate position of the carriage sensed by said transducer for generating residual length of selection time data dependent on an updated forecast of the residual length of time requested by said selecting means for completing the positioning of the selected character in front of said hammer, distance calculating means responsive to said transducer for generating distance data dependent on the residual distance between the actual intermediate position of the carriage and said new print position, and feeding means responsive to said residual length of time data and to said distance data for feeding said servo control with the new speed data dependent on said residual selection time and on the residual distance of the carriage from said new print position.

3. A serial printer according to claim 2 further comprising timing means for starting the movement of said hammer when said carriage reaches one printing position of said discrete intermediate positions proximate to said new printing point and selected according to the speed of said carriage and to the length of the flight time of the hammer so as to time the impact of the selected character at the instant when the carriage reaches said new print position.

4. A serial printer according to claim 3 further comprising a data source for producing, for each character being printed, signals indicative of the impact energy of said hammer, and wherein said timing means are jointly conditioned by said signals indicative of the impact energy.

5. A serial printer according to claim 2, wherein said selecting means comprise a selection transducer for sensing discrete angular positions of said type member and first programming means for driving said type member with a command velocity dependent on the number of discrete angular positions included on said variable angle and wherein said residual length of selecting time forecast means comprise programmed means responsive to the angular positions sensed by said selection transducer for generating said residual length of selection time data.

6. A serial printer according to claim 5, wherein said programming means drive said type member according to a free motion substantially accelerated as fast as possible up to a maximum speed during a first part of said variable angle and a velocity controlled motion substantially decelerated during a second part of said variable angle, and wherein said velocity controlled motion is effected in accordance with a predetermined law of velocity dependent on the discrete angular positions of said type-member.

7. A serial printer according to claim 6 further comprising comparator means responsive to each new discrete position of the selection transducer for detecting whether said type-member is positioned within the first part or the second part of said variable angle and for actuating said programmed means to generate said residual length of selection time only when the type-member is positioned on the second part of said variable angle.

8. A serial printer as in claim 7, wherein the velocity servo control of said motor is fed with a constant data associated with the selection length of time data when the type member is positioned on the first part of said variable angle and wherein said constant data is indicative of an average constant velocity command of said carriage dependent on the forecast length of selection time and on the distance of the carriage between the preceding print position and the new print position.

9. A serial printer as in claim 6 further comprising conversion means responsive to said new speed data to generate printing distance data dependent on the distance covered by the carriage during the impact stroke of the hammer; and comparator means responsive to said distance data and to said printing distance data for actuating said hammer when said distance data and said printing distance data are substantially alike, and wherein said comparator means causes said new speed data to be held constant to hold constant the velocity of the carriage during the impact stroke of the hammer.

10. A serial printer as in claim 7, wherein said comparator means actuates said programmed means after the type member has been rotated at least half of said variable angle.

11. A serial printer according to claim 2, wherein the preceding print position and the new print position relate to adjacent characters of the printing line and wherein the number of the intermediate positions between the preceding and the new print position is dependent on the width of the last printed character and the width of the character to be printed.

12. A serial printer according to claim 2, wherein said discrete intermediate positions are included between two print positions of said line distance 1.10" from each other.

13. A serial printer comprising a carriage movable along a printing line and mounting a hammer and a rotatable character bearing element; selecting means actuatable for rotating said character bearing element a variable angle from one character position to another character position for positioning a selected character in front of the print hammer in view of the print of said selected character; and driving means for said carriage for minimizing the length of time necessary to the movement of the carriage along the printing line between a preceding print position of a last printed character and a new print position of the character to be printed, wherein said driving means comprise:
a servo motor for the movement of the carriage along the printing line;
detecting means for detecting whether a blank length more than a predetermined length from said new print position is enclosed between the preceding print position and the new print position;
first controlling means actuatable for feeding said servo mechanism for driving said carriage for the speediest movement along said blank length if the carriage is away from said predetermined length;
selection time forecast means for forecasting a length of selection time required by said selecting means for the rotation of the character bearing element through said variable angle;
second controlling means actuatable for operating on said servo motor for driving said carriage according to such velocities as to cause said carriage to cover said predetermined length on said forecast length of selection time and to pass through the new printing point with the maximum speed consistent with a good print operation; and
switching means responsive to said detecting means, when the carriage reaches said predetermined length for making inoperative said first controlling means and for actuating said selecting means and said second controlling means.

14. A serial printer according to claim 13, further comprising means for detecting the instantaneous position of said carriage included between in said predetermined length and wherein said second controller includes means responsive to said instantaneous position for forecasting a residual length time employed for completing the positioning of the character to be selected in front of the hammer and a command device for displacing said carriage according to speeds selected according to the instantaneous position of said carriage and according to said residual length of time, in such a way as to condition the passage of said carriage through said new printing point at the instant when the selected character is printed.

15. A serial printer according to claim 13, wherein said predetermined length is of the order of 0.27".

* * * * *